(12) United States Patent
Du et al.

(10) Patent No.: US 12,415,880 B1
(45) Date of Patent: Sep. 16, 2025

(54) POSS-BASED HYBRID SUPERCRITICAL $CO_2$ THICKENER AND PREPARATION METHOD THEREOF

(71) Applicant: SOUTHWEST PETROLEUM UNIVERSITY, Chengdu (CN)

(72) Inventors: Daijun Du, Chengdu (CN); Jintao Li, Chengdu (CN); Wanfen Pu, Chengdu (CN); Jinzhou Zhao, Chengdu (CN); Pengfei Chen, Chengdu (CN); Ying Xiong, Chengdu (CN); Rui Jiang, Chengdu (CN); Tao Wu, Chengdu (CN); Mingming Song, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/755,865

(22) Filed: Jun. 27, 2024

(30) Foreign Application Priority Data

May 6, 2024 (CN) .......................... 202410543792.0

(51) Int. Cl.
| | |
|---|---|
| *C08F 283/12* | (2006.01) |
| *C08F 220/24* | (2006.01) |
| *C08F 230/08* | (2006.01) |
| *C08G 77/06* | (2006.01) |
| *C09K 8/70* | (2006.01) |

(52) U.S. Cl.
CPC ............ *C08F 283/124* (2013.01); *C09K 8/70* (2013.01); *C08F 220/24* (2013.01); *C08F 230/08* (2013.01); *C08G 77/06* (2013.01)

(58) Field of Classification Search
CPC .. C08F 283/124; C08F 220/24; C08F 230/08; C08G 77/06
See application file for complete search history.

(56) References Cited

FOREIGN PATENT DOCUMENTS

| CN | 103435741 A | * | 12/2013 | |
| CN | 112708138 A | * | 4/2021 | ............. C08G 77/44 |
| CN | 118126260 A | | 6/2024 | |

OTHER PUBLICATIONS

Machine translation of CN-103435741-A obtained from IP.com. (Year: 2013).*
Machine translation of CN-112708138-A obtained from IP.com (Year: 2021).*

* cited by examiner

*Primary Examiner* — Kregg T Brooks
*Assistant Examiner* — David R. Foss
(74) *Attorney, Agent, or Firm* — Birchwood IP

(57) ABSTRACT

The present invention discloses a POSS-based hybrid supercritical $CO_2$ thickener and a preparation method thereof, and relates to the technical field of oil and gas field development. The preparation method of the thickener comprises the following steps: reacting tetramethyl tetravinylcyclotetrasiloxane, trimethylolpropane trimethacrylate, perfluoroacrylate and POSS containing one double bond in a molar ratio of 1-5:1-2:1-2:0.005-0.01 under the action of a catalyst to obtain the thickener. The preparation method of the POSS-based hybrid supercritical $CO_2$ thickener of the present invention is a bulk reaction, does not require the addition of a solvent, and does not pollute the human body and the environment in the production process. The POSS-based hybrid supercritical $CO_2$ thickener of the present invention has a high thickening efficiency on supercritical carbon dioxide and can better increase the viscosity of the supercritical carbon dioxide, so that the carrying and supporting effects of the supercritical carbon dioxide are improved.

6 Claims, No Drawings

POSS-BASED HYBRID SUPERCRITICAL $CO_2$ THICKENER AND PREPARATION METHOD THEREOF

CROSS-REFERENCE TO RELATED APPLICATIONS

This application claims priority to Chinese Patent Application No. 202410543792.0, filed on May 6, 2024, which is hereby incorporated by reference in its entirety.

TECHNICAL FIELD

The present invention relates to the technical field of oil and gas field development, and specifically to a POSS-based hybrid supercritical $CO_2$ thickener and a preparation method thereof.

BACKGROUND

At present, more than 70% of the proven oil and gas reservoirs in China are unconventional oil and gas reservoirs, and have the characteristics of permeability less than 0.1 mD and porosity less than 10%. In recent years, the hydraulic fracturing technology has made rapid progress, which effectively improves the development progress of unconventional oil and gas reservoirs and brings considerable economic benefits; however, this technology also brings many challenges: (1) the water resource consumption is serious; (2) clay swelling causes reservoir damage; (3) the water-based fracturing fluid is easily retained in the formation and easily contaminates the underground water; and (4) the flowback liquid treatment is difficult and costly. To solve the above problems, scholars proposed supercritical $CO_2$ fracturing technology. The supercritical $CO_2$ has a density similar to that of liquid and a viscosity similar to that of gas, has the advantages of a high diffusion coefficient, low interfacial tension and strong permeability, and can dissolve in crude oil to expand, reduce viscosity, and increase the desorption efficiency of shale gas. However, the supercritical $CO_2$ has low viscosity and poor carrying and supporting effects, resulting in unsatisfactory fracturing results.

Currently, the supercritical $CO_2$ thickener mainly includes hydrocarbon polymers, surfactants, siloxanes and fluorocarbons. The hydrocarbon polymers have low solubility in $CO_2$ and need to rely on co-solvents. The surfactants are used in large quantities and have weak thickening properties. The siloxanes have limited solubility in $CO_2$ without the addition of co-solvents. The fluorocarbons are expensive and have certain biological toxicity. Therefore, it is necessary to prepare a novel supercritical $CO_2$ thickener to solve the above disadvantages. The nanomaterials have strong small-scale interfacial effects and extremely large specific surface areas. Introducing the nanomaterials into the supercritical $CO_2$ thickener is expected to improve the viscosity-increasing effect of the thickener. Polyhedral oligomeric silsesquioxane (POSS) is an organic-inorganic hybrid structure compound, which comprises an inorganic skeleton core composed of Si and O elements and an organic substituent shell with different properties. POSS has the characteristics of regular structure, small size, controllable reactivity or active group quantity, excellent thermal stability, good compatibility and the like, and is a hotspot in the field of composite material research.

SUMMARY

To solve at least one of the above problems, the present invention provides a POSS-based hybrid supercritical $CO_2$ thickener and a preparation method thereof.

The preparation method of the POSS-based hybrid supercritical $CO_2$ thickener comprises the following steps: reacting tetramethyl tetravinylcyclotetrasiloxane, trimethylolpropane trimethacrylate, perfluoroacrylate and POSS containing one double bond in a molar ratio of 1-5:1-2:1-2:0.05-0.15 under the action of a catalyst to obtain the thickener.

According to one embodiment of the present invention, the catalyst is chloroplatinic acid and azobisisobutyronitrile, and the chloroplatinic acid and azobisisobutyronitrile have a concentration of 20-60 ppm.

Further, the method specifically comprises the following steps: taking tetramethyl tetravinylcyclotetrasiloxane, adding chloroplatinic acid at a temperature of 70-100° C., keeping the temperature for 1-3 h, then dropwise adding trimethylolpropane trimethacrylate into the solution, and keeping the temperature for 3-6 h after dropwise adding is completed; and cooling to room temperature, adding perfluoroacrylate, POSS containing one double bond and azobisisobutyronitrile, heating to 50-70° C., and keeping the temperature for 3-6 h to obtain the thickener.

According to one embodiment of the present invention, the POSS containing one double bond is heptaoctyl methacryloxypropyl POSS. In fact, for POSS, only one double bond is needed to react, and the specific structure of POSS has no great influence on the present invention. The heptaoctyl methacryloxypropyl POSS is used because of the ready availability.

According to one embodiment of the present invention, the perfluoroacrylate is one of heptadecafluorodecyl acrylate, hexadecafuorononyl acrylate, heptadecafluoroundecyl acrylate and octadecafluorodecyl acrylate.

Further, the heptaoctyl methacryloxypropyl POSS is prepared by the following steps: weighing 10-15 mL of concentrated hydrochloric acid, 40-50 mL of absolute ethyl alcohol and 50-60 mL of water, mixing, and heating to 35-45° C.; uniformly mixing 23.8-33.3 g of N-octyltrimethoxysilane and 3.6-5.4 g of Y-methacryloxypropyltrimethoxysilane, then dropwise adding the mixture into the mixed solution, and keep the temperature for 2-3 days after dropwise adding; stopping stirring, separating an organic layer after the mixed solution is layered, washing the organic layer by water several times, and then drying the organic layer to obtain the heptaoctyl methacryloxypropyl POSS.

The POSS-based hybrid supercritical $CO_2$ thickener is prepared by any one of the methods, and has a good viscosity-increasing effect on supercritical carbon dioxide.

Beneficial effects: (1) the preparation method of the POSS-based hybrid supercritical $CO_2$ thickener of the present invention is a bulk reaction, does not require the addition of a solvent, and does not pollute the human body and the environment in the production process; and (2) the POSS-based hybrid supercritical $CO_2$ thickener of the present invention has a high thickening efficiency on supercritical carbon dioxide and can better increase the viscosity of the supercritical carbon dioxide, so that the carrying and supporting effects of the supercritical carbon dioxide are improved, and the fracturing effect is further improved.

DESCRIPTION OF EMBODIMENTS

The present invention is further described in detail below with reference to the examples; however, the embodiments of the present invention are not limited thereto.

In the following examples, the articles are conventional commercial articles in the art unless otherwise specified.

In the following examples, the operations are conventional operations in the art unless otherwise specified.

Example 1: adding 34.4 g of tetramethyl tetravinylcyclotetrasiloxane into a 250 mL three-neck flask with a reflux device, starting stirring, heating to 90° C., and then adding 40 ppm of chloroplatinic acid for activation for 2 h; dropwise adding 33.8 g of trimethylolpropane trimethacrylate by using a constant-pressure dropping funnel, and keeping the temperature for 4 h after dropwise adding is completed to obtain a colorless transparent product; and after the product is reduced to room temperature, adding 51.8 g of heptadecafluorodecyl acrylate, 9.36 g of heptaoctyl methacryloxypropyl polyhedral oligomeric silsesquioxane and 40 ppm of azobisisobutyronitrile under the condition of stirring, heating to 60° C., and keeping the temperature for 4 h to obtain a colorless transparent product, namely a target product.

Example 2: adding 68.8 g of tetramethyl tetravinylcyclotetrasiloxane into a 250 mL three-neck flask with a reflux device, starting stirring, heating to 90° C., and then adding 40 ppm of chloroplatinic acid for activation for 2 h; dropwise adding 33.8 g of trimethylolpropane trimethacrylate by using a constant-pressure dropping funnel, and keeping the temperature for 4 h after dropwise adding is completed to obtain a colorless transparent product; and after the product is reduced to room temperature, adding 51.8 g of heptadecafluorodecyl acrylate, 9.36 g of heptaoctyl methacryloxypropyl polyhedral oligomeric silsesquioxane and 40 ppm of azobisisobutyronitrile under the condition of stirring, heating to 60° C., and keeping the temperature for 4 h to obtain a colorless transparent product, namely a target product.

Example 3: adding 34.4 g of tetramethyl tetravinylcyclotetrasiloxane into a 250 mL three-neck flask with a reflux device, starting stirring, heating to 90° C., and then adding 40 ppm of chloroplatinic acid for activation for 2 h; dropwise adding 67.6 g of trimethylolpropane trimethacrylate by using a constant-pressure dropping funnel, and keeping the temperature for 4 h after dropwise adding is completed to obtain a colorless transparent product; and after the product is reduced to room temperature, adding 51.8 g of heptadecafluorodecyl acrylate, 9.36 g of heptaoctyl methacryloxypropyl polyhedral oligomeric silsesquioxane and 40 ppm of azobisisobutyronitrile under the condition of stirring, heating to 60° C., and keeping the temperature for 4 h to obtain a colorless transparent product, namely a target product.

Example 4: adding 34.4 g of tetramethyl tetravinylcyclotetrasiloxane into a 250 mL three-neck flask with a reflux device, starting stirring, heating to 90° C., and then adding 40 ppm of chloroplatinic acid for activation for 2 h; dropwise adding 33.8 g of trimethylolpropane trimethacrylate by using a constant-pressure dropping funnel, and keeping the temperature for 4 h after dropwise adding is completed to obtain a colorless transparent product; and after the product is reduced to room temperature, adding 103.6 g of heptadecafluorodecyl acrylate, 9.36 g of heptaoctyl methacryloxypropyl polyhedral oligomeric silsesquioxane and 40 ppm of azobisisobutyronitrile under the condition of stirring, heating to 60° C., and keeping the temperature for 4 h to obtain a colorless transparent product, namely a target product.

Example 5: adding 34.4 g of tetramethyl tetravinylcyclotetrasiloxane into a 250 mL three-neck flask with a reflux device, starting stirring, heating to 90° C., and then adding 40 ppm of chloroplatinic acid for activation for 2 h; dropwise adding 33.8 g of trimethylolpropane trimethacrylate by using a constant-pressure dropping funnel, and keeping the temperature for 4 h after dropwise adding is completed to obtain a colorless transparent product; and after the product is reduced to room temperature, adding 51.8 g of heptadecafluorodecyl acrylate, 18.72 g of heptaoctyl methacryloxypropyl polyhedral oligomeric silsesquioxane and 40 ppm of azobisisobutyronitrile under the condition of stirring, heating to 60° C., and keeping the temperature for 4 h to obtain a colorless transparent product, namely a target product.

Example 6: adding 34.4 g of tetramethyl tetravinylcyclotetrasiloxane into a 250 mL three-neck flask with a reflux device, starting stirring, heating to 90° C., and then adding 40 ppm of chloroplatinic acid for activation for 2 h; dropwise adding 33.8 g of trimethylolpropane trimethacrylate by using a constant-pressure dropping funnel, and keeping the temperature for 4 h after dropwise adding is completed to obtain a colorless transparent product; and after the product is reduced to room temperature, adding 51.8 g of hexadecafuorononyl acrylate, 9.36 g of heptaoctyl methacryloxypropyl polyhedral oligomeric silsesquioxane and 40 ppm of azobisisobutyronitrile under the condition of stirring, heating to 60° C., and keeping the temperature for 4 h to obtain a colorless transparent product, namely a target product.

This example is different from Example 1 in that the added fluoroacrylate is hexadecafuorononyl acrylate.

Example 7: adding 34.4 g of tetramethyl tetravinylcyclotetrasiloxane into a 250 mL three-neck flask with a reflux device, starting stirring, heating to 90° C., and then adding 40 ppm of chloroplatinic acid for activation for 2 h; dropwise adding 33.8 g of trimethylolpropane trimethacrylate by using a constant-pressure dropping funnel, and keeping the temperature for 4 h after dropwise adding is completed to obtain a colorless transparent product; and after the product is reduced to room temperature, adding 51.8 g of heptadecafluoroundecyl acrylate, 9.36 g of heptaoctyl methacryloxypropyl polyhedral oligomeric silsesquioxane and 40 ppm of azobisisobutyronitrile under the condition of stirring, heating to 60° C., and keeping the temperature for 4 h to obtain a colorless transparent product, namely a target product.

Example 8: adding 34.4 g of tetramethyl tetravinylcyclotetrasiloxane into a 250 mL three-neck flask with a reflux device, starting stirring, heating to 90° C., and then adding 40 ppm of chloroplatinic acid for activation for 2 h; dropwise adding 33.8 g of trimethylolpropane trimethacrylate by using a constant-pressure dropping funnel, and keeping the temperature for 4 h after dropwise adding is completed to obtain a colorless transparent product; and after the product is reduced to room temperature, adding 51.8 g of octadecafluorodecyl acrylate, 9.36 g of heptaoctyl methacryloxypropyl polyhedral oligomeric silsesquioxane and 40 ppm of azobisisobutyronitrile under the condition of stirring, heating to 60° C., and keeping the temperature for 4 h to obtain a colorless transparent product, namely a target product.

Comparative Example 1 is different from Example 1 in that heptaoctyl methacryloxypropyl polyhedral oligomeric silsesquioxane is not added, and the rest are the same.

To further illustrate the effect of the thickeners prepared by the examples of the present invention, the thickeners are tested below.

The supercritical $CO_2$ fracturing fluid with the mass concentration of 5% was prepared by using the thickeners prepared by Examples 1-8 and the thickener prepared by Comparative Example 1, the dissolution pressure of the thickeners and the viscosity of the fracturing fluid at 40° C. were measured by a high-temperature high-pressure visual dissolution kettle and an JS-ND rotational viscometer, and the final results are shown in Table 1.

TABLE 1

| | Solubility and viscosity increasing properties | |
|---|---|---|
| No. | Dissolution pressure (MPa) | Viscosity (mPa · s) |
| Example 1 | 8.52 | 6.4 |
| Example 2 | 8.62 | 7.3 |
| Example 3 | 8.48 | 5.9 |
| Example 4 | 7.92 | 8.5 |
| Example 5 | 7.96 | 7.4 |
| Example 6 | 8.63 | 6.1 |
| Example 7 | 8.53 | 6.6 |
| Example 8 | 8.48 | 6.7 |
| Comparative Example 1 | 8.92 | 5.2 |

It can be seen from Table 1 that the POSS-based hybrid supercritical $CO_2$ thickener prepared by the examples of the present invention has high thickening performance on supercritical carbon dioxide. Meanwhile, referring to Comparative Example 1, it can be known that not only the dissolution pressure of the thickener product is reduced, but also the viscosity of the supercritical carbon dioxide can be increased after the POSS is added, which indicates that POSS plays a more critical role in the thickener of the example of the present invention.

The above descriptions are merely preferred specific embodiments of the present invention, however, the protection scope of the present invention is not limited thereto, and any modifications and substitutions that can be easily conceived by those skilled in the art within the technical scope disclosed by the present invention shall fall within the protection scope of the present invention.

What is claimed is:

1. A preparation method of a POSS-based hybrid supercritical $CO_2$ thickener, comprising the following steps: reacting tetramethyl tetravinylcyclotetrasiloxane, trimethylolpropane trimethacrylate, perfluoroacrylate and POSS containing one double bond in a molar ratio of 1-5:1-2:1-2:0.05-0.15 under the action of a catalyst to obtain the thickener, wherein the catalyst is chloroplatinic acid and azobisisobutyronitrile; and the method specifically comprises the following steps: taking tetramethyl tetravinylcyclotetrasiloxane, adding chloroplatinic acid at a temperature of 70-100° C., keeping the temperature for 1-3 h, then dropwise adding trimethylolpropane trimethacrylate into the solution, and keeping the temperature for 3-6 h after dropwise adding; and cooling to room temperature, adding perfluoroacrylate, POSS containing one double bond and azobisisobutyronitrile, heating to 50-70° C., and keeping the temperature for 3-6 h to obtain the thickener.

2. The method according to claim 1, wherein the chloroplatinic acid and azobisisobutyronitrile have a concentration of 20-60 ppm.

3. The method according to claim 1, wherein the perfluoroacrylate is one of heptadecafluorodecyl acrylate, hexadecafuorononyl acrylate, heptadecafluoroundecyl acrylate and octadecafluorodecyl acrylate.

4. The method according to claim 1, wherein the POSS containing one double bond is heptaoctyl methacryloxypropyl POSS.

5. The method according to claim 4, wherein the heptaoctyl methacryloxypropyl POSS is prepared by the following steps: weighing 10-15 mL of concentrated hydrochloric acid, 40-50 mL of absolute ethyl alcohol and 50-60 mL of water, mixing, and heating to 35-45° C.; uniformly mixing 23.8-33.3 g of N-octyltrimethoxysilane and 3.6-5.4 g of γ-methacryloxypropyltrimethoxysilane, then dropwise adding the mixture into the mixed solution, and keep the temperature for 2-3 days after dropwise adding; stopping stirring, separating an organic layer after the mixed solution is layered, washing the organic layer by water several times, and then drying the organic layer to obtain the heptaoctyl methacryloxypropyl POSS.

6. A POSS-based hybrid supercritical $CO_2$ thickener prepared by the method according to claim 1.

* * * * *